United States Patent [19]
Oztaskin et al.

[11] Patent Number: 5,559,965
[45] Date of Patent: Sep. 24, 1996

[54] INPUT/OUTPUT ADAPTER CARDS HAVING A PLUG AND PLAY COMPLIANT MODE AND AN ASSIGNED RESOURCES MODE

[75] Inventors: Ali S. Oztaskin, Beaverton; John L. Allen; Ganesh Murthy, both of Hillsboro, all of Oreg.

[73] Assignee: Intel Corporation, Santa Clara, Calif.

[21] Appl. No.: 299,906

[22] Filed: Sep. 1, 1994

[51] Int. Cl.⁶ .................................................. G06F 13/00
[52] U.S. Cl. ........................... 395/284; 395/828; 395/830
[58] Field of Search .................................... 395/828, 829, 395/830, 831, 834, 284, 282, 700

[56] References Cited

U.S. PATENT DOCUMENTS

| | | | |
|---|---|---|---|
| 4,589,063 | 5/1986 | Shah et al. | 395/828 |
| 5,014,193 | 5/1991 | Garner et al. | 395/830 |
| 5,038,320 | 8/1991 | Heath et al. | 395/830 |
| 5,313,592 | 5/1994 | Buondonno et al. | 395/284 |
| 5,371,892 | 12/1994 | Petersen et al. | 395/700 |
| 5,440,693 | 8/1995 | Arnold et al. | 395/284 |
| 5,517,646 | 5/1996 | Piccirillo et al. | 395/700 |

*Primary Examiner*—Glenn A. Auve
*Attorney, Agent, or Firm*—Blakely, Sokoloff, Taylor & Zafman

[57] ABSTRACT

An input/output adapter card for a standard bus in a computer system is disclosed that includes a nonvolatile memory that stores a plug and play identifier, a set of resource data, and a mode indication. The mode indication is programmed by an installation routine for the input/output adapter card to specify whether the input/output adapter card is plug and play compliant. The input/output adapter card accesses the mode indication and "plays" a configuration record from the nonvolatile memory to the configuration registers if the mode indication specifies that the computer system is not plug and play compliant. The configuration record mimics configuration writes to the configuration registers by a plug and play compliant computer system.

26 Claims, 9 Drawing Sheets

INPUT/OUTPUT ADAPTER CARDS HAVING A PLUG AND PLAY COMPLIANT MODE AND AN ASSIGNED RESOURCES MODE

BACKGROUND OF THE INVENTION

1. Field of the Invention

The present invention pertains to the field of computer system architecture. More particularly, this invention relates to configuring input/output adapters in a computer system according to a plug and play compliant mode or according to an assigned resources mode.

2. Background

Standard bus architectures are commonly employed for coupling optional hardware input/output adapters into a computer system. Optional input/output adapters for such computer systems typically include peripheral devices such as disk drive interfaces, as well as network communication subsystems and graphics subsystems.

Such an input/output adapter typically contains a set of internal interface registers accessible by the central processing unit via the standard bus. Typically, the internal interface registers in each input/output adapter are mapped to separate portions of the standard bus input/output address space. Such a mapping of the internal interface registers to separate address spaces prevents bus conflicts among the input/output adapters.

In prior systems, a default input/output address mapping is commonly factory preset in each input/output adapter. Such a preselected input/output addresses mapping may be programmed in hardware in the input/output adapters or may be selected by switch settings or jumpers located on the input/output adapters. The default input/output address mapping for an input/output adapter may require modification as the input/output adapter is installed in a computer system in order to prevent input/output addressing conflicts with other input/output adapters already installed in the computer system.

In some prior computer systems, a "hit or miss" installation technique is often employed for selecting input/output addresses for newly installed input/output adapters. Such a hit or miss technique requires that an arbitrary input/output address be assigned to each input/output adapter at installation time. If a newly installed input/output adapter fails to function properly with the arbitrary input/output address selection, then another input/output address is usually arbitrarily selected. Such a hit or miss process repeats until the new input/output adapter functions properly. Unfortunately, such a hit or miss technique becomes cumbersome as the number of input/output adapters installed in the computer system increases.

Other prior computer systems provide automated mechanisms for configuring newly installed input/output adapters on the standard bus. For example, some prior computer systems that contain a standard bus conforming to the industry standard architecture (ISA) standard may implement a plug and play mechanism for automatically configuring input/output adapters on the ISA bus. The Plug and Play (PnP) ISA specification version 1.0a, Mar. 24, 1994, by Intel Corporation of Santa Clara, Calif., and Microsoft Corporation of Everett, Washington, defines a mechanism that provides automatic configuration capability for PnP ISA input/output adapters. The PnP ISA specification defines a hardware protocol for implementation on all PnP compliant input/output adapters as well as extensions to the basic input/output software (BIOS) and to the operating system of PnP compliant computer systems.

However, input/output adapters designed to conform to such a PnP mechanism are typically required to function properly in a computer system that is not PnP compliant. For example, a large number of personal computer systems that contain an ISA bus are not PnP compliant. Typically, such non PnP compliant computer systems lack the BIOS extensions and/or the operating system extensions required for PnP compliance. In such a non PnP compliant computer system, the end user must first install PnP configuration software. The installation of PnP configuration software is very technical and beyond the capability of most end users.

SUMMARY AND OBJECTS OF THE INVENTION

One object of the present invention is to provide an input/output adapter for a standard bus architecture that functions in both plug and play compliant and non plug and play compliant computer systems.

Another object of the present invention is to allow an end user to physically install an input/output adapter into a standard bus slot of a computer system and invoke an installation routine for the input/output adapter that performs automatic configuration.

A further object of the present invention is to enable the installation software to complete installation by loading drivers and applications for the input/output adapter if the computer system is already plug and play compliant.

Another object of the present invention is to enable the installation software to allocate a set of conflict free system resources and configure the input/output adapter to employ the conflict free system resources if the computer system is not already plug and play compliant.

Another object of the present invention is to enable installation of input/output adapters in a computer system without requiring the end user to create an accurate resource map for the computer system whether or not the computer system is plug anti play compliant.

These and other objects of the present invention are provided by an input/output adapter card for a standard bus in a computer system. The input/output adapter card contains a set of configuration registers that determine a set of system resources allocated to the input/output adapter card according to a plug and play standard protocol for the standard bus. The input/output adapter card includes a nonvolatile memory that stores a plug and play identifier, a set of resource data, and a mode indication. The resource data indicates the system resources required by the input/output adapter card and the mode indication specifies whether the computer system is plug and play compliant. The input/output adapter card also includes a control unit that accesses the mode indication and that reads a configuration record from the nonvolatile memory and that writes the configuration record into the configuration registers if the .mode indication specifies that the computer system is not plug and play compliant. An installation routine on the computer system for the input/output adapter card writes the configuration record to the non volatile memory and writes the mode indication to specify whether the computer system is plug and play compliant. The configuration record mimics configuration writes to the configuration registers by a plug and play compliant computer system. Otherwise, the input/output adapter functions in a normal plug and play compliant mode according to the mode indication.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
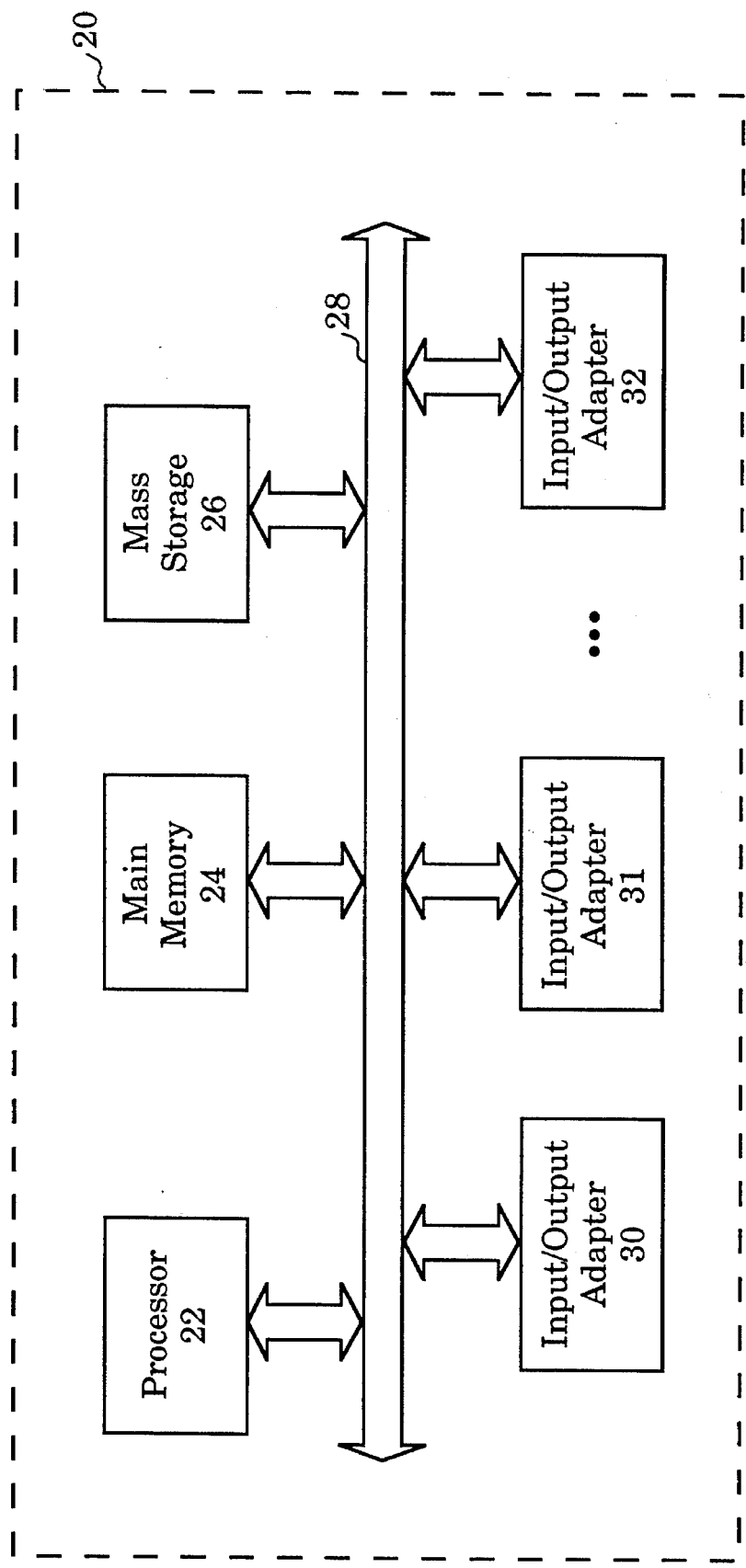
FIG. 1 illustrates a computer system for one embodiment which comprises a processor, a main memory, a mass storage subsystem, and a set of input/output adapters which are all coupled for communication over a standard bus.

FIG. 1 illustrates a computer system 20 for one embodiment. The computer system 20 comprises a processor 22, a main memory 24, a mass storage subsystem 26, and a set of input/output adapters 30–32. The processor 22, the main memory 24, and the mass storage subsystem 26 along with the input/outputs 30–32 are coupled for communication over a standard bus 28. The standard bus 28 conforms to the industry standard architecture (ISA) bus standard.

The input/outputs 30–32 are each coupled to the standard bus 28 through a standard bus slot. The input/output adapter 30 implements a plug and play (PnP) compliant automatic configuration mechanism and a preassigned resources automatic configuration mechanism.

For another embodiment, the processor 22 is not directly coupled to the standard bus 28. Instead, the processor 22 is coupled for communication over a processor bus which in turn communicates with the standard bus 28 via a bus bridge (not shown). Similarly, the main memory 24 and the mass storage subsystem 26 may be coupled to a processor bus or other component buses in the computer system 20.

Figure 2:
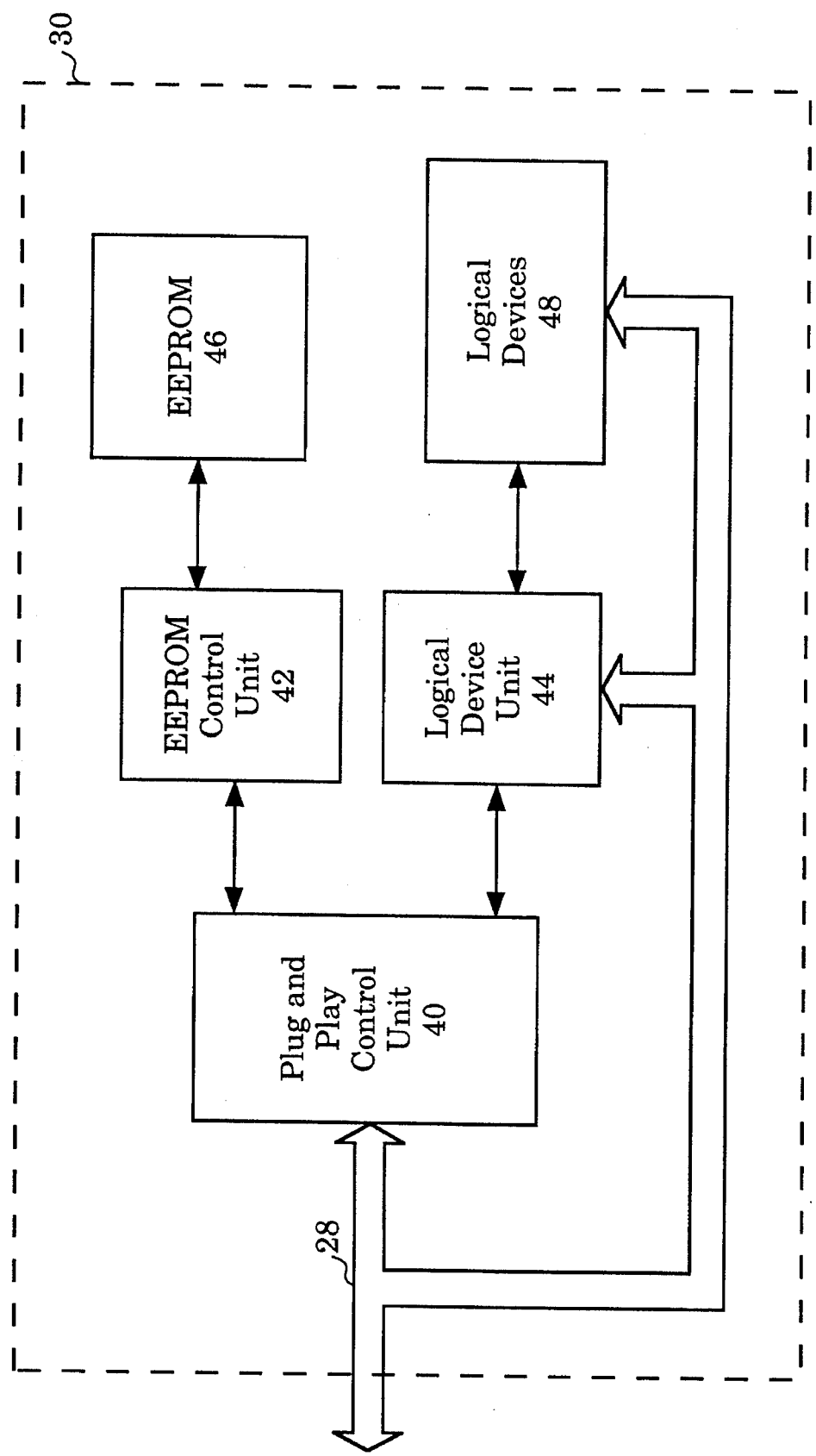
FIG. 2 illustrates an input/output adapter for one embodiment which comprises a plug and play control unit, an electrically erasable programmable read only memory (EEPROM) control unit, a logical device unit, an EEPROM, and a set of logical devices.

FIG. 2 illustrates the input/output adapter 30 for one embodiment. The input/output adapter 30 comprises a plug and play control unit 40, an electrically erasable programmable read only memory (EEPROM) control unit 42, a logical device unit 44, a EEPROM 46, and a set of logical devices 48. The plug and play control unit 40 and the logical devices 48 are coupled for communication over the standard bus 28.

The plug and play control unit 40 implements a plug and play compliant mode and a preassigned resources mode. The plug and play compliant mode is defined by the Plug and Play ISA specification, version 1.0a, dated March 24, 1994. The plug and play control unit 40 contains the auto configuration ports and plug and play configuration registers defined by the Plug and Play ISA specification.

The EEPROM control unit 42 enables the plug and play control unit 40 to read data from and write data to the EEPROM 46. The logical device unit 44 enables the plug and play control unit 40 to access i/o configuration information used by logical devices 48.

The logical devices 48 implement the predetermined hardware functions for the input/output adapter 30. For example, if the input/output adapter 30 is an Ethernet communication module, then the logical devices 48 include circuitry for performing communication over an Ethernet communication line (not shown) coupled to the input/output adapter 30.

Figure 3:
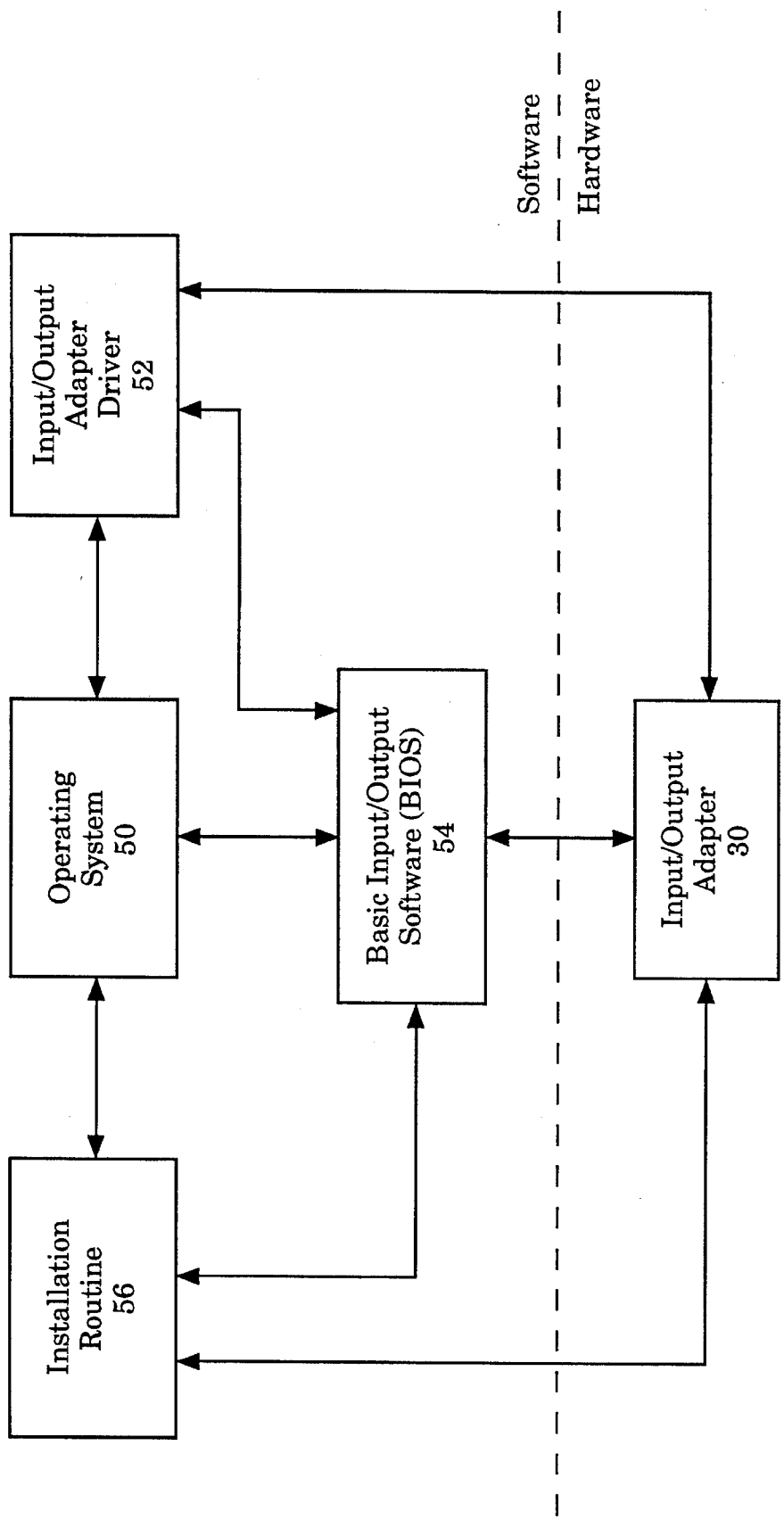
FIG. 3 is a diagram that illustrates the software elements of the computer system that interact with the input/output adapter including an operating system, a set of basic input/output software (BIOS), an input/output adapter driver, and an installation routine.

FIG. 3 is a diagram that illustrates the software elements of the computer system 20 that interact with the input/output adapter 30. The software elements implemented on the computer system 20 include an operating system 50, a set of basic input/output software (BIOS) 54, and an input/output adapter driver 52, and an installation routine 56.

The installation routine 56 installs the input/output adapter driver 52 for the input/output adapter 30. The installation routine 56 also installs application programs for the input/output adapter 30 where appropriate. If the operating system 50 and the BIOS 54 are both non PnP compliant, then the installation routine 56 performs automatic configuration on the input/output adapter 30 according to the preassigned resources mode of the input/output adapter 30. Otherwise, the installation routine 56 loads the input/output adapter driver 52 and associated application programs, and either the operating system 50 or the BIOS 54 automatically configures the input/output adapter 30 according to the PnP configuration sequence defined in the Plug and Play ISA specification.

The PnP compliant automatic configuration software implemented in the operating system 50 or the BIOS 54 places all input/output adapters 30–32 that are PnP compliant into a PnP configuration mode. The PnP compliant automatic configuration software then isolates each PnP compliant input/output adapter 30–32 one input/output adapter at a time. The PnP compliant automatic configuration software assigns a unique "handle" to each isolated PnP compliant input/output adapter 30–32. The PnP compliant automatic configuration software; then reads a resource data structure from each isolated PnP compliant input/output adapter 30–32.

The PnP compliant automatic configuration software of the operating system 50 or the BIOS 54 uses the resource data structure from each PnP compliant input/output adapter 30–32 to determine the system resource requirements and capabilities for the PnP compliant input/output adapters 30–32. The plug and play auto configuration software then assigns conflict free system resources to each PnP compliant input/output adapter 30–32. Thereafter, the plug and play auto configuration software activates all of the PnP compliant input/output adapters 30–32 and removes the activated input/output adapters 30–32 from the PnP configuration mode.

The PnP compliant automatic configuration software of the operating system 50 or the BIOS 54 identifies and configures the input/output adapter 30 according to a set of commands defined by the plug and play ISA specification. The plug and play commands are communicated to the input/output adapter 30 over the standard bus 28 via a set of three 8 bit input/output ports.

Table 1 describes the input/output ports of the input/output adapter 30 employed by the PnP compliant automatic configuration software of the operating system 50 or the BIOS 54. A sequence of data writes to one of the command ports provides an initiation key that enables the plug and play logic in the input/output adapter 30. The plug and play logic for the input/output adapter 30 is contained in the plug and play control unit 40. The plug and play control unit 40 processes the plug and play commands through the input/output ports on the standard bus 28 listed in Table 1.

TABLE 1

| Auto-configuration Ports | | |
| --- | --- | --- |
| Port Name | PnP Complaint Locations | Type |
| ADDRESS | 0X0279 (Printer staus port) | Write-only |
| WRITE_DATA | 0x0A79 (Printer status port + 0x0800) | Write-only |
| READ_DATA | Relocatable in range 0x0203 to 0x03FF | Read-only |

The input/output ports listed in Table 1 are employed by the PnP compliant automatic configuration software of the operating system 50 or the BIOS 54 to access a configuration space of the input/output adapter 30. The configuration space of the input/output adapter 30 comprises a set of eight bit registers contained in the plug and play control unit 40. The configuration registers enable the PnP compliant automatic configuration software of the operating system 50 or the BIOS 54 or the installation routine 56 to issue commands, to check status, to access resource data information, and to configure the plug and play hardware in the plug and play control unit 40.

For one embodiment, the ADDRESS and the WRITE_DATA ports are located at fixed addresses on the standard bus 28. The READ_DATA port is relocatable on the standard bus 28. The plug and play registers of the plug and play control unit 40 are accessed by a data write of the address of the desired register to the ADDRESS port followed by a data read from the READ_DATA port or a data write to the WRITE_DATA port. Such accesses by the PnP compliant automatic configuration software of the operating system 50 or the BIOS 54 comprises a series of address data pairs for accessing the plug and play registers in the plug and play control unit 40.

The PnP compliant automatic configuration software of the operating system 50 or the BIOS 54 transfers an initiation key to the input/output adapter 30 to place the input/output adapter 30 into the configuration mode. The initiation key comprises a series of writes to the ADDRESS port of the plug and play control unit 40. The initiation key series of writes are decoded by the plug and play control unit 40. The plug and play control unit 40 enters the configuration mode if the proper series of input/output writes to the ADDRESS port is detected on the standard bus 28.

The plug and play control unit 40 checks the initiation key using a linear feedback shift register in the plug and play control unit 40. The PnP compliant automatic configuration software of the operating system 50 or the BIOS 54 generates a linear feedback shift register sequence and writes the linear feedback shift register sequence to the ADDRESS port of the plug and play control unit 40 as a sequence of eight bit input/output write cycles over the standard bus 28. The linear feedback shift register (not shown) of the plug and play control unit 40 verifies the sequence of eight bit write cycles and enables the plug and play logic on the input/output adapter as appropriate.

Figure 4:
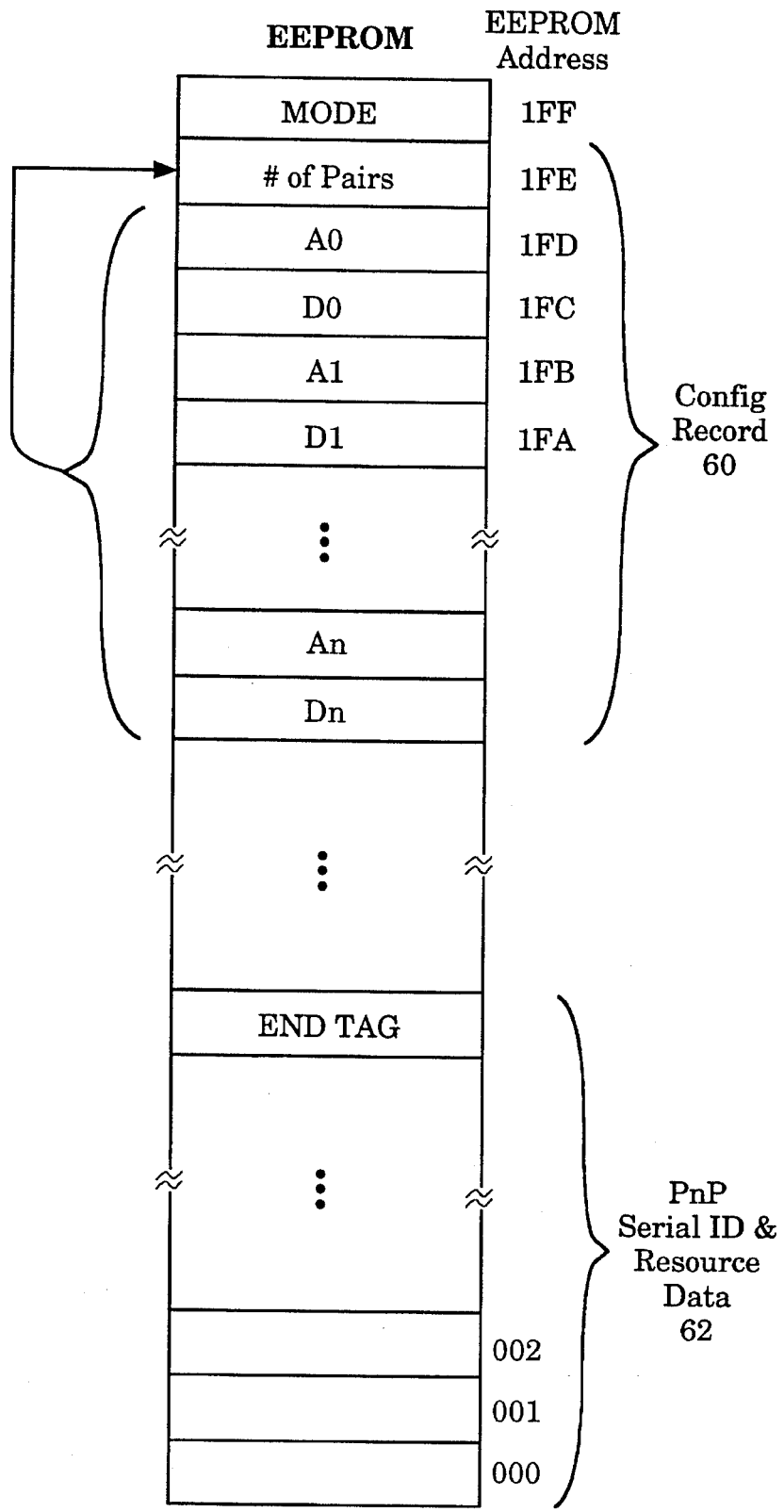
FIG. 4 illustrates the format of information stored in the EEPROM for one embodiment.

FIG. 4 illustrates the format of information stored in the EEPROM 46 for one embodiment. The information in the EEPROM 46 includes a mode byte at the highest address. A configuration record 60 is located adjacent to the mode byte and a plug and play serial identifier and resource data structure 62 are located at the lowest addresses of the EEPROM 46.

At reset, the plug and play control unit 40 reads the mode byte from the EEPROM 46. Bits 0 and 1 of the mode byte determine the steps taken by the plug and play control unit 40 prior to entering a wait for key state according to the PnP ISA specification. Bits 2 and 3 of the mode byte are used to optionally change the parameters of the PnP automatic configuration protocol.

The configuration record 60 comprises a set of address/data pairs and a byte indicating the number of address/data pairs (# of pairs). The plug and play control unit 40 reads the configuration record 60 in a descending order. The plug and play control unit 40 plays the configuration record 60 to the plug and play control registers by writing the data field of each address/data pair to the PnP configuration register specified by the address field of the corresponding address/data pair.

If the operating system 50 or the BIOS 54 is PnP compliant, then the configuration manager software of the operating system 50 or the BIOS 54 isolates the input/output adapter 30 and reads the resource data from the plug and play control unit 40. The configuration manager of the operating system 50 or the BIOS 54 then allocates resources for the input/output adapter 30 and assigns the system resources to the input/output adapter 30. The configuration manager of the operating system 50 or the BIOS 54 assigns the systems resources to the input/output adapter 30 by performing a series of write operations to the plug and play control registers of the plug and play control unit 40 when isolated.

If the operating system 50 and the BIOS 54 are not plug and play compliant, then the installation routine 56 constructs the configuration record 60 in the EEPROM 46 to mimic the plug and play register accesses that would be performed by a PnP compliant configuration manager. The installation routine 56 allocates a set of system resources for the input/output adapter 30 and then constructs the configuration record 60 in the EEPROM 46 to assign the allocated resources. The contents of the mode byte determines whether the configuration record 60 is played to the PnP configuration registers in the plug and play control unit 40. The played out configuration record 60 assigns the system resources allocated by the installation routine 56 to the input/output adapter 30.

Figure 5:
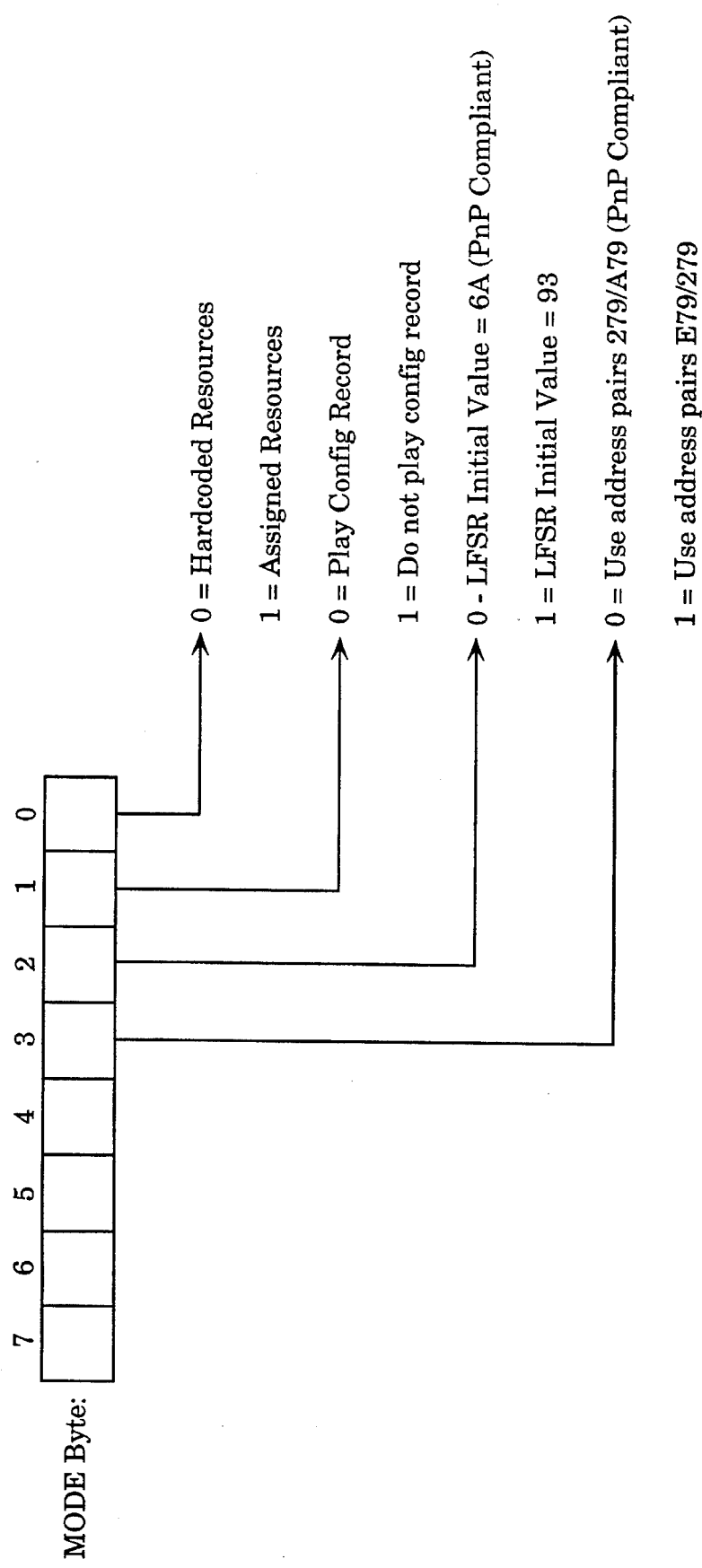
FIG. 5 illustrates the format of the mode byte in the EEPROM for one embodiment.

FIG. 5 illustrates the format of the mode byte in the EEPROM 46 for one embodiment. Bit 0 of the mode byte determines whether the input/output adapter 30 contains hardcoded resources or is assigned resources by the installation routine 56 or by the PnP configuration manager of the operating system 50 or the BIOS 54. Bit 1 of the mode byte indicates whether the configuration record 60 is played to the PnP configuration registers in the plug and play control unit 40 prior to an entry into the "wait for key" state by the plug and play control unit 40. Bit 2 of the mode byte indicates whether the initial value of the linear feedback shift register of plug and play control unit 40 equals 6A hexadecimal which is PnP compliant or D3 hexadecimal which is not PnP compliant. Bit 3 of the mode byte provides the address pairs for the plug and play auto configuration ports of the input/output adapter 30. The plug and play auto configuration ports may or may not be PnP compliant under control of bit 3 of the mode byte.

Figure 6:
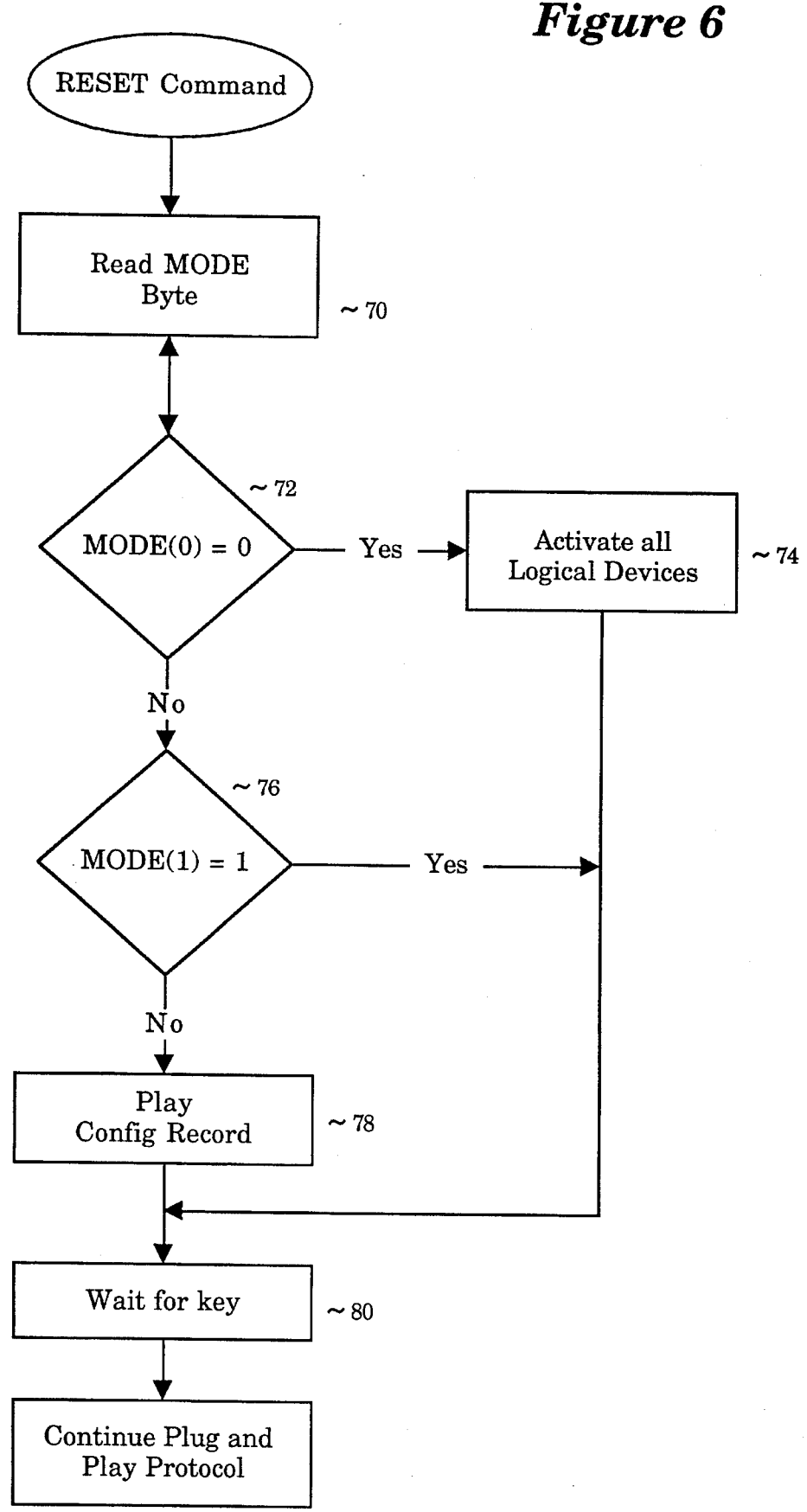
FIG. 6 is a flow chart that illustrates the processing of the mode byte by the plug and play control unit prior to entering the "wait for key" state defined by the PnP ISA specification.

FIG. 6 is a flow chart that illustrates the processing of the mode byte by the plug and play control unit 40 prior to entering the "wait for key" state defined by the PnP ISA specification. The plug and play control unit 40 is initialized via a reset command received over the standard bus 28.

At block 70, the plug and play control unit 40 reads the mode byte from the EEPROM 46. If bit 0 of the mode byte equals 0 at decision block 72 then control proceeds to block 74. At block 74, the plug and play control unit 40 activates the logical devices 48. Thereafter, control proceeds to block 80 to wait for the initiation key from the configuration manager of the operating system 50 or the BIOS 54.

If bit 0 of the mode byte is not 0 at decision block 72, then control proceeds to decision block 76. At decision block 76, the plug and play control unit 40 determines whether bit 1 of the mode byte is 1. If bit 1 of the mode byte is 1 at decision block 76 then control proceeds to block 80 to wait for the initiation key from the configuration manager of the operating system 50 or the BIOS 54.

If bit 1 of the mode byte does not equal 1 at decision block 76 then control proceeds to block 78. At block 78, the plug and play control unit 40 plays out the configuration record 60 to the PnP configuration registers in the plug and play control unit 40. Thereafter, control proceeds to block 80 to wait for the initiation key from the configuration manager.

Table 2 illustrates the PnP input/output space configuration registers in the plug and play control unit 40. The PnP input/output space configuration registers determine the input/output port base address for each logical device 48 contained in the input/output adapter 30.

Table 3 illustrates the PnP interrupt eonfiguration registers for the input/output adapter 30 contained in the plug and play control unit 40 for one embodiment. The PnP interrupt configuration registers in the plug and play control 40 determine the interrupt request levels for the logical devices 48 of the input/output adapter 30.

TABLE 3

Interrupt and DMA Channel Configuration

| Name | Register Index | Definition |
| --- | --- | --- |
| Interrupt request level select 0 | 0x70 | Read/write value indicating the selected interrupt level. |
| Interrupt request type select 0 | 0x71 | Read/write value indicating the which type of interrupt is used for the Request Level 0. |
| Interrupt request level select 1 | 0x72 | Read/write value indicating selected interrupt level. |
| Interrupt request type select 1 | 0x73 | Read/write value indicating which type of interrupt is used for the Request Level 1. |
| DMA channel select 0 | 0x74 | Read/write value indicating selected DMA channels. Bits[2:0] select which DMA channel is in use for DMA 0. Zero selects DMA channel 0, seven selects DMA channel 7. DMA channel 4, the cascade channel is used to indicate no DMA channel is active. |
| DMA channel select 1 | 0x75 | Read/write value indicating selected DMA channels. Bits[2:0] select which DMA channel is in use for DMA 1. Zero selects DMA channel 0, seven selects DMA, channel 7. DMA channel 4, the cascase channel is used to indicate no DMA channel is active. |

The PnP configuration manager of the operating system 50 or the BIOS 54 writes the input/output space configuration registers and the interrupt configuration registers in the plug and play control unit 40 during auto configuration on the input/output adapter 30. Alternatively, the input/output space configuration registers and the interrupt configuration registers in the plug and play control unit 40 are played out from the configuration record 60 under control of the mode byte as determined by the installation routine 56.

TABLE 2

I/O Space Configuration

| Name | Register Index | Defination |
| --- | --- | --- |
| I/O port base address bits [15:8] descriptor 0 | 0x60 | Read/write value indicating the selected I/O lower limit address bits[15:8] for I/O descriptor 0. |
| I/O port base address bits [7:0] descriptor 0 | 0x61 | Read/write value indicating the selected I/O lower limit address bits[7:0] for I/O descriptor 0. |
| I/O port address descriptors [1–6] | 0x62 – 0x6D | I/O base address for I/O descriptors 1–6 |
| I/O port base address bits[15:8] descriptor 7 | 0x6E | Read/write value indicating the selected I/O base address bits[7:0] for I/O descriptor 7. |
| I/O port base address bits[7:0] descriptor 7 | 0x6F | Read/write value indicating the selected I/O base address bits[7:0] for I/O descriptor 7. |

Figure 7:
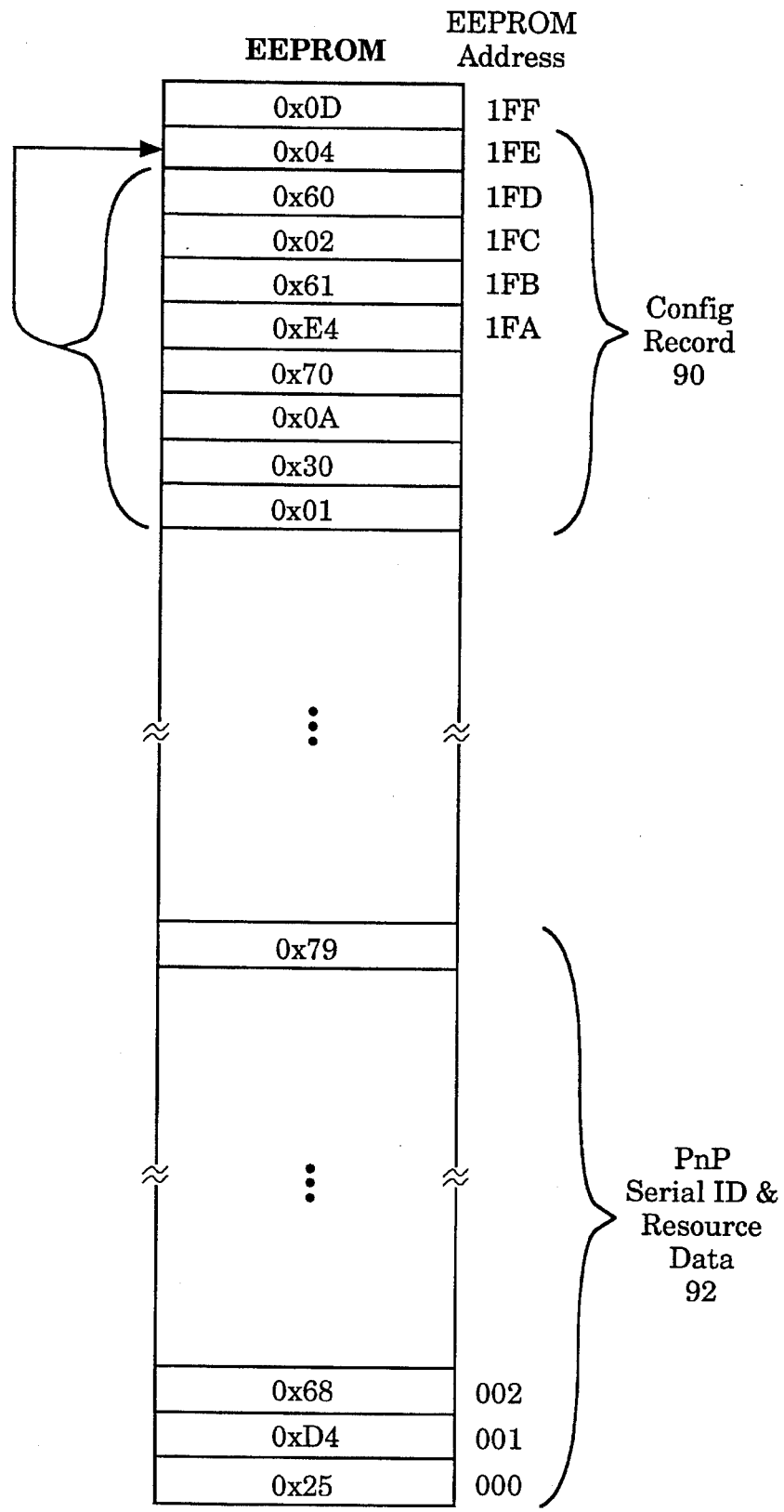
FIG. 7 illustrates an example of the contents of the EEPROM for the preassigned resources mode of the input/output adapter.

FIG. 7 illustrates the contents of the EEPROM 46 for the preassigned resources mode of the input/output adapter 30. The mode byte equal to 0D hexadecimal causes the plug and play control unit 40 to play out the configuration record 90 to the PnP control registers. The configuration record 90 when played assigns an io_base address equal to 2E4 hexadecimal and an interrupt request level of 10 hex for the input/output adapter 30. The mode byte also selects alternate linear feedback shift register initial value and an alternate address/write port for PnP accesses.

Figure 8:
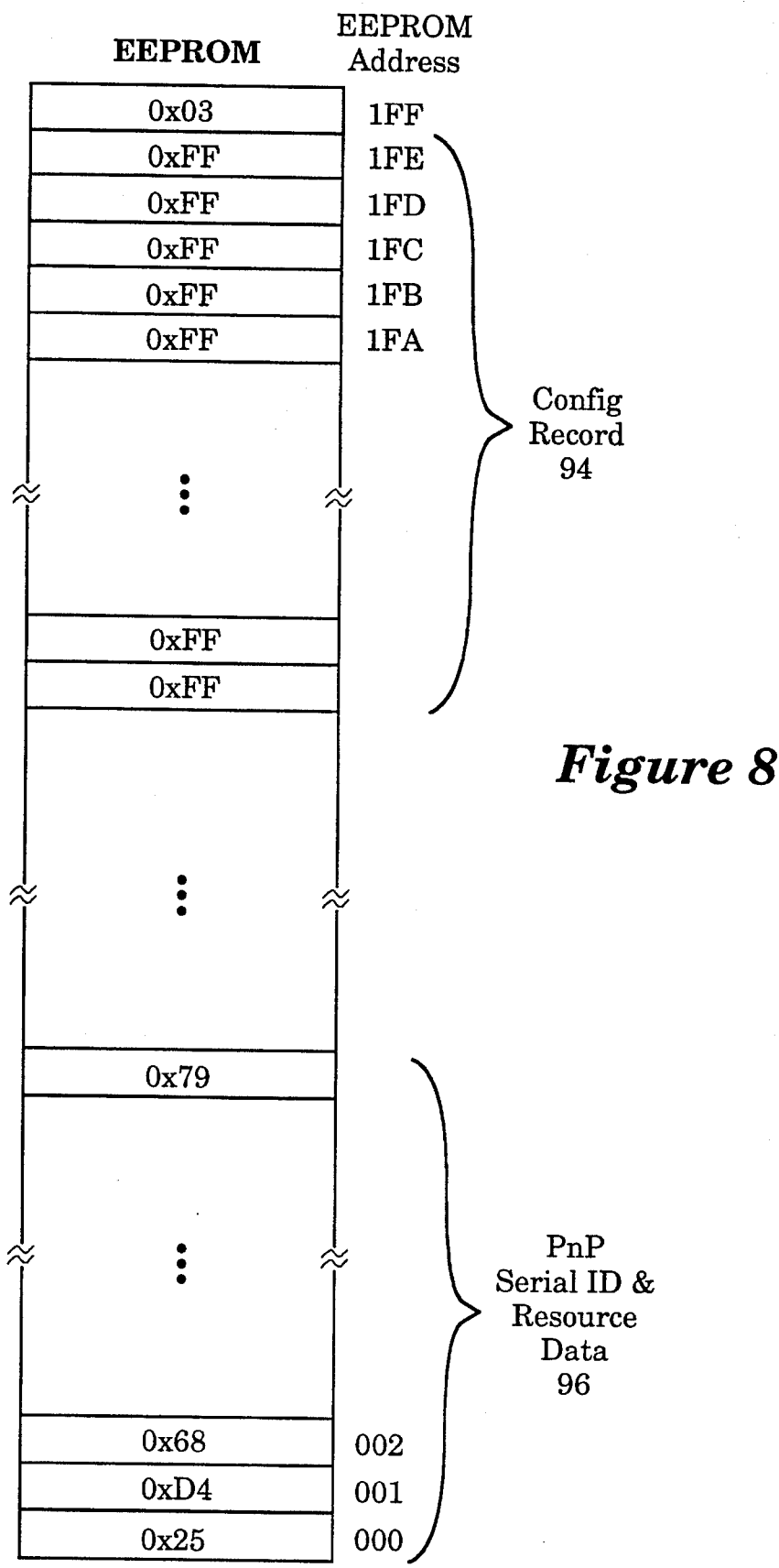
FIG. 8 illustrates the parameters in the EEPROM for the PnP compliant mode of the input/output adapter which causes the plug and play control unit to not play out the configuration record to the PnP control registers.

FIG. 8 illustrates the parameters in the EEPROM 46 for the PnP compliant mode of the input/output adapter 30. The mode byte equal to 3 causes the plug and play control unit 40 to not play out the configuration record 94 to the PnP control registers. The mode byte equal to 3 selects a PnP compliant linear feedback shift register initial value and the PnP compliant address/write ports for PnP accesses over the standard bus 28.

Figure 9:
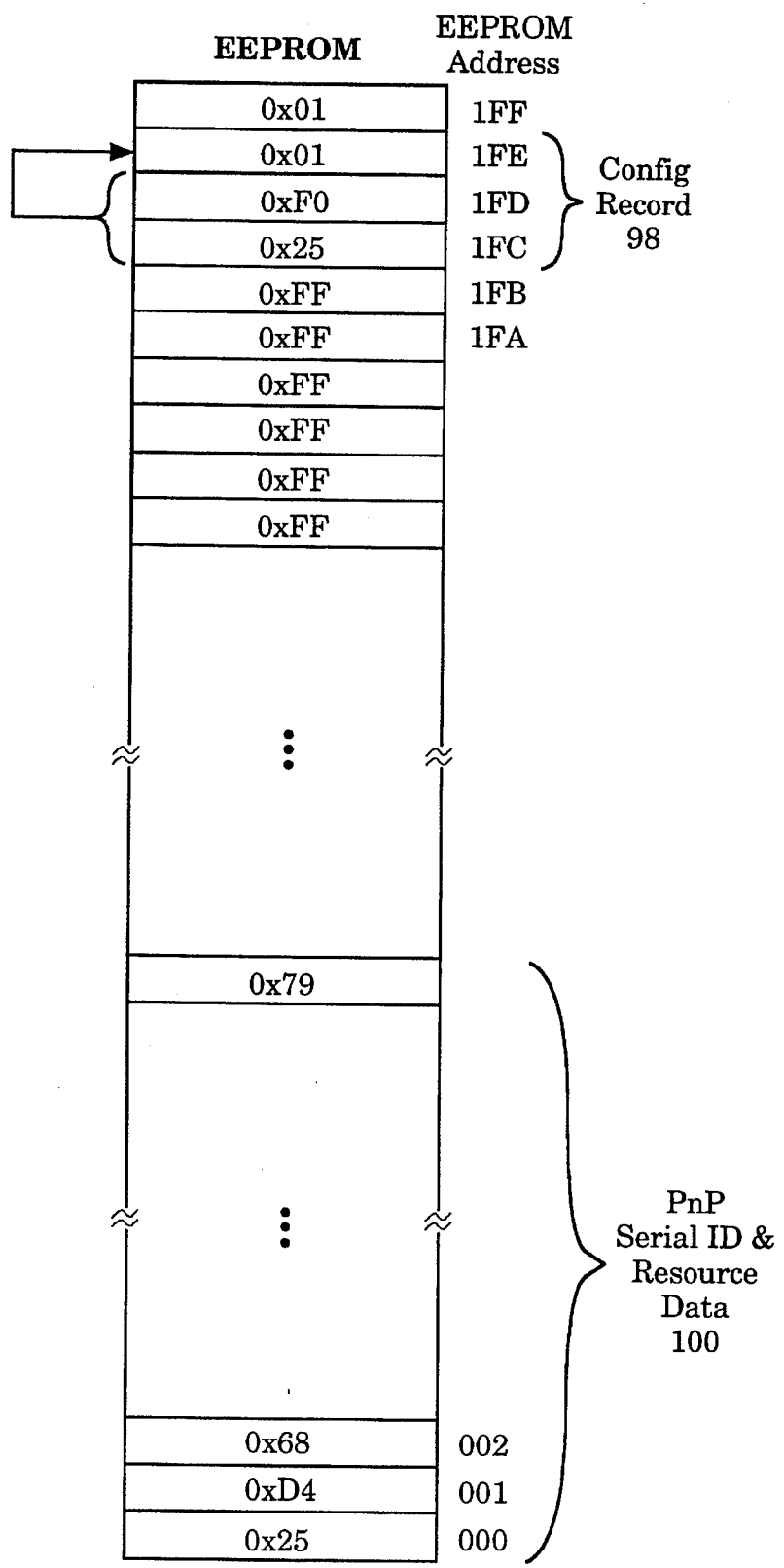
FIG. 9 illustrates the parameters in the EEPROM if the input/output adapter is PnP compliant with partial initialization which causes the plug and play control unit to play the configuration record to the PnP configuration registers.

FIG. 9 illustrates the parameters in the EEPROM 46 if the input/output adapter 30 is PnP compliant with partial initialization. The mode byte equal to 1 causes the plug and play control unit 40 to play the configuration record 98 to the PnP configuration registers. The configuration record 98 when played selects logical device 0 and initializes configuration register F0 hexadecimal to 25 hexadecimal.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. An input/output adapter card for a standard bus in a computer system, comprising:

configuration registers that determine a set of system resources allocated to the input/output adapter card;

nonvolatile memory that stores a plug and play identifier, a set of resource data, and a mode indication, the resource data indicating the system resources required by the input/output adapter card, the mode indication specifying whether the computer system is plug and play compliant; and a control unit that accesses the mode indication, the control unit reading a configuration record from the nonvolatile memory and writing the configuration record into the configuration registers if the mode indication specifies that the computer system is not plug and play compliant.

2. The input/output adapter card of claim 1, wherein an installation routine on the computer system for the input/output adapter card writes the configuration record to the non volatile memory and writes the mode indication to specify whether the computer system is plug and play compliant.

3. The input/output adapter card of claim 1, wherein the control unit enters, after writing the configuration record to the configuration registers, a wait for key state to detect an initiation key on the standard bus that corresponds to the plug and play identifier.

4. The input/output adapter card of claim 1, wherein the configuration record mimics data written by a set of writes to the configuration registers performed by a computer system that is plug and play compliant.

5. The input/output adapter card of claim 1, wherein the configuration record comprises a set of address/data pairs each comprising a configuration register address and a data value such that the control unit writes the data values to the corresponding configuration register addresses if the mode indication specifies that the input/output adapter card is not plug and play compliant.

6. The input/output adapter card of claim 5, wherein the configuration record further comprises an indication of a number of the address/data pairs contained in the configuration record.

7. A computer system, comprising:

an input/output adapter card coupled to a standard bus in the computer system, the input/output adapter card having a set of configuration registers that determine a set of allocated system resources for the input/output adapter card, the input/output adapter card capable of storing a mode indication and a configuration record, the input/output adapter card having circuitry for writing the configuration record into the configuration registers if the mode indication specifies that the computer system is not plug and play compliant; and a processor coupled for communication over the standard bus, wherein the processor executes an installation routine that writes the configuration record to the input/output adapter card and writes the mode indication to the input/output adapter card to specify whether the computer system is plug and play compliant.

8. The computer system of claim 7, wherein the input/output adapter card comprises a nonvolatile memory that stores a plug and play identifier, a set of resource data, and the mode indication, wherein the resource data indicates the system resources required by the input/output adapter card, and the mode indication specifying whether the computer system is plug and play compliant.

9. The computer system of claim 8, wherein the circuitry for writing the configuration record comprises a control unit that reads the configuration record from the nonvolatile memory and that writes the configuration record into the configuration registers if the mode indication specifies that the computer system is not plug and play compliant.

10. The computer system of claim 9, wherein the installation routine executed by the processor writes the configuration record to the non volatile memory and writes the mode indication to the non volatile memory to specify whether the input/output adapter card is plug and play compliant.

11. The computer system of claim 9, wherein the control unit enters, after writing the configuration record to the configuration registers, a wait for key state to detect an initiation key on the standard bus that corresponds to the plug and play identifier.

12. The computer system of claim 9, wherein the configuration record mimics data written by a set of writes to the configuration registers performed by the installation routine executed by the processor if the computer system is plug and play compliant.

13. The computer system of claim 9, wherein the configuration record comprises a set of address/data pairs each comprising a configuration register address and a data value such that the control unit writes the data values to the corresponding configuration register addresses if the mode indication specifies that the input/output adapter card is not plug and play compliant.

14. The computer system of claim 13, wherein the configuration record further comprises an indication of a number of the address/data pairs contained in the configuration record.

15. A method for configuring an input/output adapter card in a computer system, comprising the steps of:

coupling the input/output adapter card to a standard bus in the computer system;

writing a configuration record to the input/output adapter card and writing a mode indication to the input/output adapter card to specify whether the computer system is plug and play compliant; and outputting the configuration record into a set of configuration registers in the input/output adapter card if the mode indication specifies that the computer system is not plug and play compliant.

16. The method of claim 15, wherein the step of writing a configuration record to the input/output adapter card and writing a mode indication to the input/output adapter card comprises the step of writing the configuration record and the mode indication and a set of resource data into a nonvolatile memory on the input/output adapter card, wherein the resource data indicates the system resources required by the input/output adapter card, and wherein the mode indication specifies whether the computer system is plug and play compliant.

17. The method of claim 16, wherein the step of writing the configuration record comprises the step of reading the configuration record from the nonvolatile memory and then writing the configuration record into the configuration registers if the mode indication specifies that the computer system is not plug and play compliant.

18. The method of claim 17, wherein the step of writing the configuration record to the non volatile memory and writing the mode indication to the non volatile memory to specify whether the input/output adapter card is plug and play compliant is performed by a processor coupled for communication over the standard bus and that executes an installation routine.

19. The method of claim 17, further comprising the step of waiting, after writing the configuration record to the configuration registers, for an initiation key on the standard bus that corresponds to the input/output adapter card.

20. The method of claim 17, wherein the configuration record mimics data written by a set of writes to the configuration registers performed by an installation routine executed by a processor if the computer system is plug and play compliant.

21. The method of claim 17, wherein the configuration record comprises a set of address/data pairs each comprising a configuration register address and a data value, and wherein the step of writing the configuration register comprises the step of writing the data values to the corresponding configuration register addresses if the mode indication specifies that the input/output adapter card is not plug and play compliant.

22. The method of claim 21, wherein the configuration record further comprises an indication of a number of the address/data pairs contained in the configuration record.

23. An apparatus for configuring an input/output adapter card in a computer system, the apparatus comprising:

means for coupling the input/output adapter card to a standard bus in the computer system;

means for writing a configuration record to the input/output adapter card and for writing a mode indication to the input/output adapter card to specify whether the computer system is plug and play compliant; and means for outputting the configuration record into a set of configuration registers in the input/output adapter card if the mode indication specifies that the computer system is not plug and play compliant.

24. The apparatus of claim 23, wherein the means for writing a configuration record to the input/output adapter card and for writing a mode indication to the input/output adapter card comprises means for writing the configuration record and the mode indication and a set of resource data into a nonvolatile memory on the input/output adapter card, wherein the resource data indicates the system resources required by the input/output adapter card, and wherein the mode indication specifies whether the computer system is plug and play compliant.

25. The apparatus of claim 24, wherein the means for writing a configuration record comprises means for reading the configuration record from the nonvolatile memory and means for writing the configuration record into the configuration registers if the mode indication specifies that the computer system is not plug and play compliant.

26. The apparatus of claim 25, wherein the configuration record mimics data written by a set of writes to the configuration registers performed by an installation routine executed by a processor if the computer system is plug and play compliant.

* * * * *

UNITED STATES PATENT AND TRADEMARK OFFICE
CERTIFICATE OF CORRECTION

PATENT NO. : 5,559,965
DATED : September 24, 1996
INVENTOR(S) : Oztaskin et al.

It is certified that error appears in the above-indentified patent and that said Letters Patent is hereby corrected as shown below:

In column 2 at line 41 delete "anti" and insert --and--

In column 7 at Table 2 delete "Defination" and insert --Definition--

In column 7 at Table 2 delete "I/O base address for I/O descriptors 1-6" and insert --I/O base addresses for I/O descriptors 1-6--

In column 8 at line 33 delete "cascase" and insert --cascade--

Signed and Sealed this

Fourth Day of February, 1997

Attest:

BRUCE LEHMAN

Attesting Officer

Commissioner of Patents and Trademarks